(12) United States Patent
Ezal et al.

(10) Patent No.: US 7,577,464 B2
(45) Date of Patent: Aug. 18, 2009

(54) COMPACT ANTENNA SYSTEM FOR POLARIZATION SENSITIVE NULL STEERING AND DIRECTION-FINDING

(75) Inventors: Kenan O. Ezal, Santa Barbara, CA (US); Thomas L. Larry, Purcellville, VA (US); Andrew S. Richen, Santa Barbara, CA (US); Michael R. Wiatt, Ventura, CA (US); Craig S. Agate, Moorpark, CA (US); Benjamin D. Werner, Santa Barbara, CA (US); Michael L. Vanblaricum, Santa Barbara, CA (US)

(73) Assignee: Toyon Research Corporation, Goleta, CA (US)

(*) Notice: Subject to any disclaimer, the term of this patent is extended or adjusted under 35 U.S.C. 154(b) by 802 days.

(21) Appl. No.: 11/154,952

(22) Filed: Jun. 17, 2005

(65) Prior Publication Data

US 2007/0293150 A1 Dec. 20, 2007

Related U.S. Application Data

(60) Provisional application No. 60/580,395, filed on Jun. 18, 2004.

(51) Int. Cl.
*H04B 1/00* (2006.01)
(52) U.S. Cl. ............... 455/562.1; 342/149; 343/818; 343/820; 343/822
(58) Field of Classification Search ............... 455/562.1; 342/149; 343/818, 820, 822
See application file for complete search history.

(56) References Cited

U.S. PATENT DOCUMENTS

| | | | |
|---|---|---|---|
| 4,366,483 A | 12/1982 | Hagedon et al. | |
| 4,591,862 A | 5/1986 | Parkhurst et al. | |
| 5,313,216 A | 5/1994 | Wang et al. | |
| 5,334,984 A * | 8/1994 | Akaba | 342/149 |

(Continued)

OTHER PUBLICATIONS

Blackman, S. and Papoli, R., *Design and Analysis of Modern Tracking Systems*, Artech House, Boston, MA, 1999.

(Continued)

*Primary Examiner*—Matthew D Anderson
*Assistant Examiner*—April S Guzman
(74) *Attorney, Agent, or Firm*—Nixon & Vanderhye PC

(57) ABSTRACT

A compact, non-phased-array, electronically reconfigurable antenna (ERA) system with at least two operational modes has a first operational objective that is polarization-sensitive null steering (PSNS) and a second operational objective that is direction-finding (DF). The system can rapidly switch between two operational states. In the first state, the system behaves like a polarization filter (PF) and operates as a controlled reception pattern antenna (CRPA), while in the second state the system behaves as an angle-of-arrival (AOA) sensor and operates as a fixed reception pattern antenna (FRPA). The system may include a spiral-mode antenna with both feed and load ports; a mode-forming network; an electronics package; and feedback control electronics. Radio frequency (RF) interference rejection and RF direction-finding may be performed as well as reduction and/or elimination of multiple jamming signals that are intentionally or unintentionally directed at a Global Positioning System (GPS). The determination of direction and location of the source of jamming signals may also be achieved.

20 Claims, 12 Drawing Sheets

U.S. PATENT DOCUMENTS

| | | | | |
|---|---|---|---|---|
| 5,461,387 | A | * | 10/1995 | Weaver .................. 342/357.08 |
| 5,786,791 | A | * | 7/1998 | Bruckert ..................... 342/457 |
| 6,011,514 | A | * | 1/2000 | Frankovich et al. ......... 342/442 |
| 6,252,553 | B1 | | 6/2001 | Solomon |
| 6,339,396 | B1 | | 1/2002 | Mayersak |
| 6,598,009 | B2 | | 7/2003 | Yang |
| 6,700,536 | B1 | * | 3/2004 | Wiegand ..................... 342/417 |
| 6,876,337 | B2 | * | 4/2005 | Larry .......................... 343/818 |
| 2005/0195103 | A1 | * | 9/2005 | Davis et al. ................... 342/99 |

OTHER PUBLICATIONS

Corzine, R. G. and Mosko, J. A., *Four-arm Spiral Antennas*, Artech House, 1990.

Ezal, K. and Agate, C., "Tracking and interception of ground-based RF sources using autonomous guided munitions with passive bearings-only sensors and tracking algorithms," *Proceedings of the SPIE*, Apr. 2004.

Ghose, R. N., *Interference Mitigation: Theory and Application*, IEEE Press, 1996.

Grossman, W., "Bearings-Only Tracking: A Hybrid Coordinate System Approach," *Journal of Guidance, Control, and Dynamics*, vol. 17, No. 3, 199.

Kennedy, H. D. and Wharton, W., "Direction-Finding Antennas and Systems," *Antenna Engineering Handbook*, Second Edition, Johnson, R. C., and Jasik, H., editors, Chapter 39, 1984.

Lipsky, S. E., *Microwave Passive Direction-finding*, John Wiley & Sons, 1987.

Penno, R. P. and Pasala, K. M., "Theory of Angle Estimation Using Multiarm Spiral Antennas," *IEEE Transactions on Aerospace and Electronics Systems*, vol. 37, No. 1, Jan. 2001.

Bullock, L.G., et al., "An Analysis of Wide-Band Microwave Monopulse Direction-Finding Techniques," IEEE Transactions on Aerospace and Electronic Systems, vol. 7, No. 1, pp. 188-203, Jan. 1971.

Sundberg, V.C. and Yaw, D.F., "ECM and ESM Antennas,", Antenna Engineering Handbook, Second Edition, Johnson, R.C., and Jasik, H., editors, Chapter 40, 1984.

Mosko, J.A., "An Introduction to Wideband Two-Channel Direction-Finding Systems, Parts I and II," Microwave Journal, Feb. & Mar. 1984.

Nakano, H., et al., "A Spiral Antenna Backed by a Conducting Plane Reflector," IEEE Transactions on Antennas and Propagation, vol. 34, No. 6, Jun. 1986.

Grossman, W., "Bearings-Only Tracking: A Hybrid Coordinate System Approach," *Journal of Guidance, Control, and Dynamics*, vol. 17, No. 3, 1991.

* cited by examiner

COMPACT ANTENNA SYSTEM FOR POLARIZATION SENSITIVE NULL STEERING AND DIRECTION-FINDING

RELATED APPLICATION

This application is based on and claims the benefit under 35 U.S.C. §§ 119 and 120 of provisional application 60/580,395 filed Jun. 18, 2004.

BACKGROUND OF THE INVENTION

1. Field of Technology

The present application relates to the field of antennas. Specifically, it relates to interference suppression (IS) and direction-finding (DF) systems.

2. Related Art

Intentional and unintentional interference is a common problem in the field of wireless communications. Interfering signals often share the same frequency band (or channel within the band) as the desired signal. When the desired signal arrives along a reflected path or paths it too can behave like an interference signal. This is often referred to as multipath or coherent interference, which can lead to partial cancellation of the signal strength. This in turn can result in signal fade or dropout. Signals unrelated to the desired signal are referred to as incoherent interference. Incoherent interference can be either broadband or narrowband. Broadband interference is spread over a large fraction of or all of the bandwidth associated with the desired signal. This interference looks like noise to the system and will effectively reduce the signal-to-noise ratio (SNR) and can swamp the desired signal or at least reduce its quality. Narrowband interference occupies a smaller fraction of the signal band. Applying narrowband-filtering or narrowband-processing techniques to the received signal can sometimes mitigate the harmful effect of narrowband interference. In the case of digital communications, both coherent and incoherent interference can lead to unacceptable bit error rates, loss of signal lock, or a corruption of the information or message in the desired signal and hereinafter "interference" refers to both coherent and incoherent interference unless otherwise indicated.

Civilian and military navigation systems increasingly rely on the accuracy of information provided by the Global Positioning System (GPS). Moreover, since GPS receivers are now embedded in many different types of systems, this dependence goes far beyond navigation and guidance systems and extends into areas such as personal communication systems (PCS) and wireless internet access systems. In military systems, the loss of GPS signal lock could cause an otherwise successful mission to fail, endangering the lives of soldiers and noncombatants, and wasting valuable resources. The same is true in civilian applications. Therefore, it is imperative not only to protect the integrity of the GPS signal, but to locate and to eliminate any threats to GPS as soon as possible. There is a need for methods of rejecting an interfering signal and methods of determining the direction of the interfering signal, and if possible, determining the location of its source.

The most common methods of interference suppression/rejection are beam steering, null steering, signal cancellation, polarization filtering, frequency incision, tapped-delay lines, and adaptive signal processing. With the exception of polarization filtering, frequency incision, and possibly adaptive signal processing methods, most of these techniques require multiple RF channels and antenna elements or phased arrays to successfully eliminate interfering signals. A good description of interference mitigation techniques can be found in Ghose [1996].

The angle-of-arrival (AOA) of a signal can be obtained through either monopulse or sequential direction-finding systems that are either active or passive, or through the use of interferometric systems. A direction-finding system is basically comprised of one or more antennas or antenna elements and a receiver such that the azimuth and/or the elevation angle of an incoming signal can be determined. Direction-finding systems use either scalar or vector processing to determine the AOA of a signal. Scalar systems work with either the amplitude or phase of a signal while vector systems work with both amplitude and phase. The receiver of a DF system can be either monopulse or sequential and may have one or more radio frequency (RF) channels. Single-channel systems either use a rotating antenna element or sequentially switch between two or more antenna outputs. In general, however, AOA information is obtained by comparing the amplitude and/or the phase of two or more RF channels. Amplitude-comparison systems measure the relative amplitude of two or more channels to determine the AOA while phase-comparison systems measure the relative phase between channels. Hybrid systems that measure both relative amplitude and phase are referred to as amplitude-phase-comparison systems. The comparison takes place either simultaneously (monopulse), or sequentially. Monopulse systems are more robust because they eliminate the effects of emitter phase and amplitude variations as a function of time. Depending on the application, DF systems measure either the elevation ($\theta$), or azimuth ($\phi$) angle-of-arrival, or both. A detailed analysis of DF systems can be found in Kennedy et al. [1984] and Lipsky [1987].

The location of the emitter is generally determined by triangulation of simultaneous (or near-simultaneous) AOA measurements from multiple DF systems that are spatially diverse, or through multiple AOA measurements from a moving DF system. In order to determine the location of an emitter it is also necessary to know the position of the DF sensor for each AOA measurement. A DF system can also be used as part of a homing system that is designed to guide a vehicle toward an emitter.

Phased-array systems are capable of providing both interference rejection/suppression and the AOA of the interfering signals. Interference suppression in conventional adaptive phased-array systems is achieved by summing the weighted outputs from two or more antenna elements. A processor determines a complex weight or set of weights for each output signal. If the weights are chosen correctly, the effective power of the interference in the final output will be significantly reduced and the desired signal strength will be enhanced. This approach to interference mitigation is performed solely within an electronic package that has two or more antenna input ports. Each such port is connected to an antenna element via an RF (radio or carrier frequency) transmission line of some type. The antenna elements are designed to have coverage that is as broad as possible but are offset from each other in position and/or orientation. These offsets have to be large enough so that there are sufficient signal phase differences among the individual element outputs. The processor uses these phase differences to advantage in determining the appropriate weights. For adequate spatial filtering, element separations ranging from 0.3 to 0.5 carrier wavelengths are required. The elements are typically passive (have fixed properties) and all the interference mitigation is provided within the system electronics package. Thus, the RF or front-end of the system is not affected by the interference-mitigating functions of the antenna system.

Phased-array antenna systems can be very effective in mitigating the impact of one or several interfering sources. Moreover, the complex weights of a phased-array antenna system can also be used to determine the AOA of one or more interfering signals. However, they also have drawbacks. The two most significant ones are:

(1) The outputs of multiple antenna elements must be handled simultaneously. This means multiple matching networks, filters, and down-converters and possibly multiple LNAs at the front-end. For some applications, the system will also require multiple AD converters.

(2) The required total antenna aperture may be unacceptably large for many applications.

Hence, there is a need for a low-cost, compact antenna system that is capable of providing good interference rejection and, if desired, the AOA of the interfering signal.

BRIEF SUMMARY OF THE INVENTION

The present invention meets some or all the needs identified above by providing a small, single aperture, low-cost controlled-receive-pattern antenna (CRPA) system for applications such as interference suppression (IS), direction-finding (DF), and threat localization. Exemplary embodiments of this invention provide an adaptive capability for mitigating the adverse impact of interference or jamming (hostile interference) to communication and navigation systems. Use may be made of a processor but interference control can be provided without multiple sets of output weights but rather by adaptively setting the biases applied to active devices in the antenna aperture. The variable impedances of these devices act in a manner that is analogous to processor weights. However, they are applied in the RF front-end where they can affect much more antenna multi-functionality than is possible with phased arrays. Moreover, like phased arrays, this system can enhance the jammer-to-signal (J/S) tolerance of the receiver and, when needed, can provide the angle-of-arrival of the interfering signal. The AOA can then be used to estimate the position of the interfering source, either through the use of several spatially diverse DF systems, or with a single DF system that is on a moving platform. A closed-loop AOA estimation process that refines the AOA estimates based on the platform dynamics can further enhance the utility and performance of the exemplary DF antenna system. The exemplary interference suppression and direction-finding system is applicable for virtually any commercial or military wireless system that is subjected to electromagnetic interference such as GPS-aided aircraft navigation systems, wireless local area networks, or wireless communications systems.

DETAILED DESCRIPTION OF EXEMPLARY EMBODIMENTS

Figure 1:
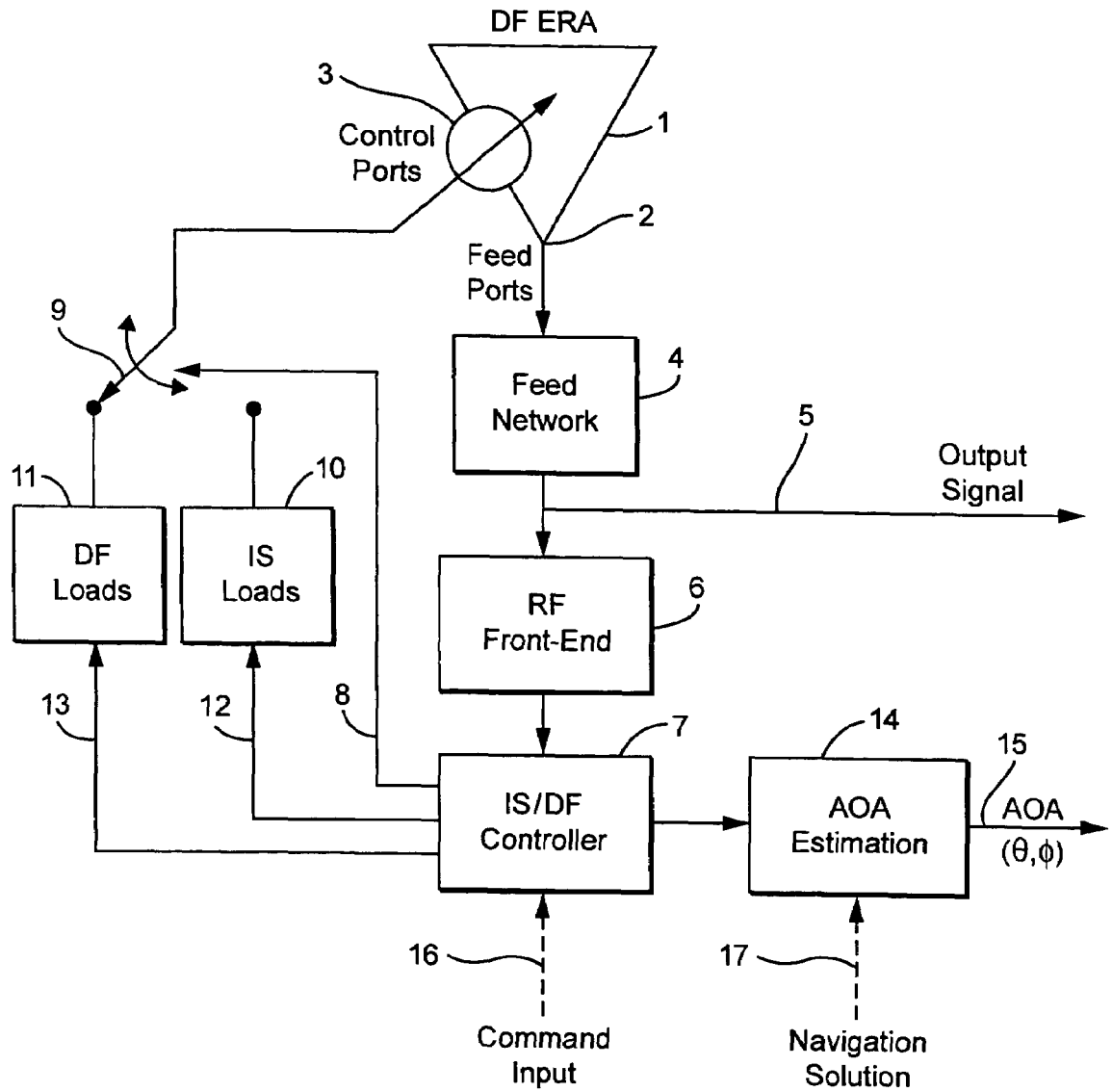
FIG. 1 is a block diagram showing all of the major components of the interference suppression and direction-finding system.

As shown in FIG. 1, in a perhaps simplest exemplary embodiment, the direction-finding and interference suppression (DF/IS) system described here may include a compact electronically reconfigurable multimode direction-finding antenna with both feed and appropriately placed control ports embedded in its aperture, a feed network, an RF front-end, microcontroller, feedback control electronics, and controllable loads attached to the control ports. While the DF capability is inherent in the choice of the multi-mode spiral antenna (Corzine et al. [1990]), the DF performance is improved through careful design of a fixed set of control loads and the optimal location of the control ports. Interference suppression is achieved through an alternative set of variable control loads that are adjusted in response to a reference signal. In spread spectrum systems this reference signal can simply be the measured power in the frequency band of interest. Alternating between the two operational modes (IS and DF) can be accomplished by switching between the two sets of control loads.

In an alternative embodiment, the DF/IS system can be provided an external command input or a measure of the quality-of-service (QoS) that can be used as a reference for interference suppression. Examples of reference signals may include the bit error rate (BER), the jammer-to-noise ratio (J/N), or the carrier-to-noise ratio (C/N). In another exemplary embodiment, the DF/IS system may accept navigation data from the guidance computer on a moving platform to improve the angle-of-arrival accuracy performance of the DF system through a multiple-hypothesis tracking and feedback control system. Some important aspects of the exemplary embodiments may include, for example:

A. Interference suppression capability achieved with a small, single-aperture antenna.

B. Both interference suppression and direction-finding capability achieved with a small, single-aperture antenna;

C. The direction-finding performance of a given DF antenna may be improved and the usable range of the system extended over what is commonly found in the literature and in industry through careful optimization of the control loads and through the use of feedback and a multiple-hypothesis tracking algorithm.

Direction-Finding Antenna and Structure

Figure 2:
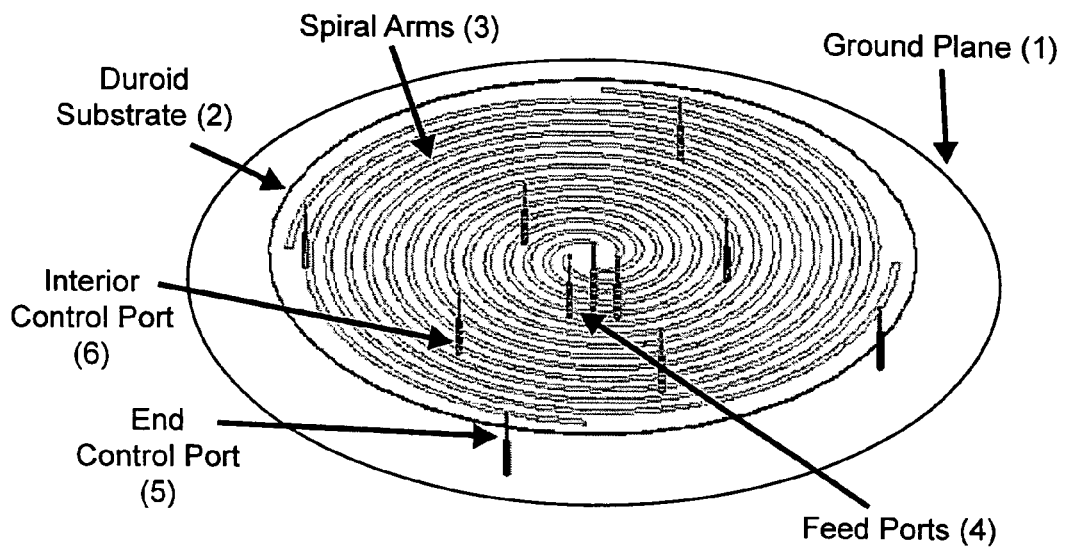
FIG. 2 shows the exemplary feed and control port structure of a spiral antenna direction-finding system.
Figure 3A:
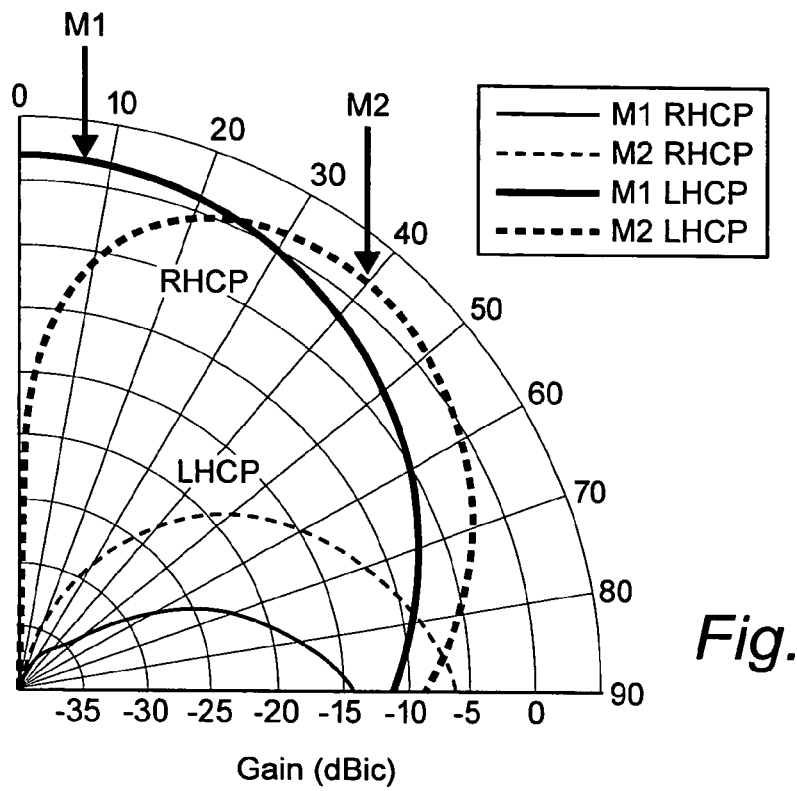
FIG. 3(A) and FIG. 3(B) show the relative gain and phase patterns of the four-arm spiral antenna as a function of elevation and azimuth angle.
Figure 3B:
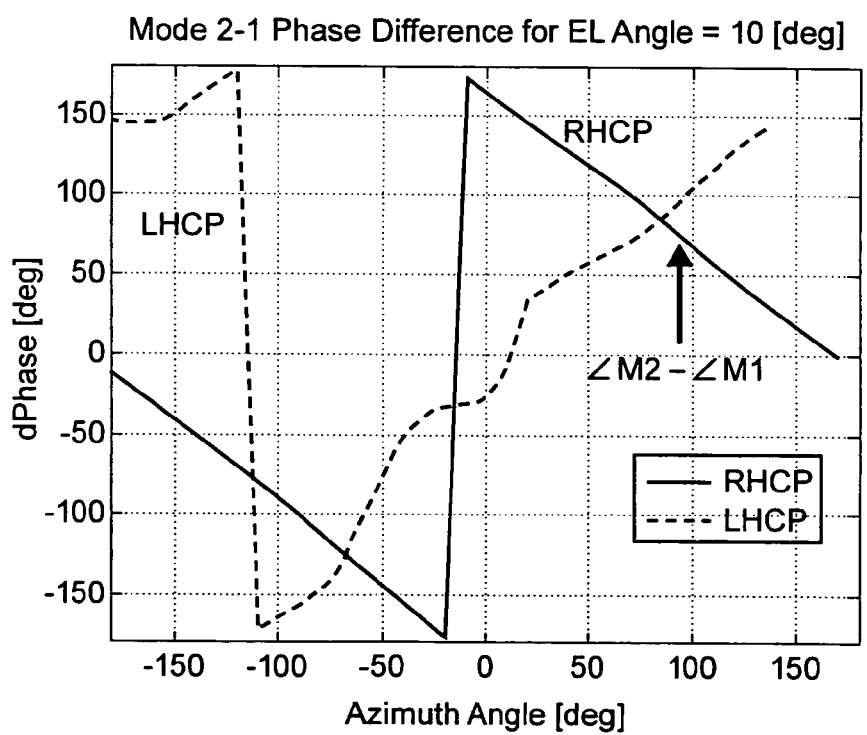

An exemplary single-aperture direction-finding antenna includes the multimode spiral antenna (FIG. 2) and its planar, conical or slotted variations such as the square spiral, Archimedean spiral, equiangular spiral, and the logarithmic spiral. Antennas may be cavity-backed or printed microstrip designs. Other examples of DF antennas include sinuous antennas, multimode horn antennas, and circular arrays of log periodic antennas fed by a Butler matrix. These antenna systems can provide angle-of-arrival information by measuring the relative gain and/or phase of two or more antenna modes. FIGS. 3(A) and 3(B) shows the right-hand-circularly-polarized (RHCP) and the left-hand-circularly-polarized (LHCP) gain and relative phase responses of a four-arm spiral antenna. Elevation information is obtained by measuring the relative gain of Mode 1 to Mode 2. The relative gain is then compared to a lookup table to determine the elevation. Azimuth information is similarly obtained by measuring the relative phase response of the system. The AOA accuracy of the system degrades as the cross polarization component (LHCP in FIGS. 3(A) and 3(B) increases. A good DF design features minimal cross polarization.

Figure 4A:
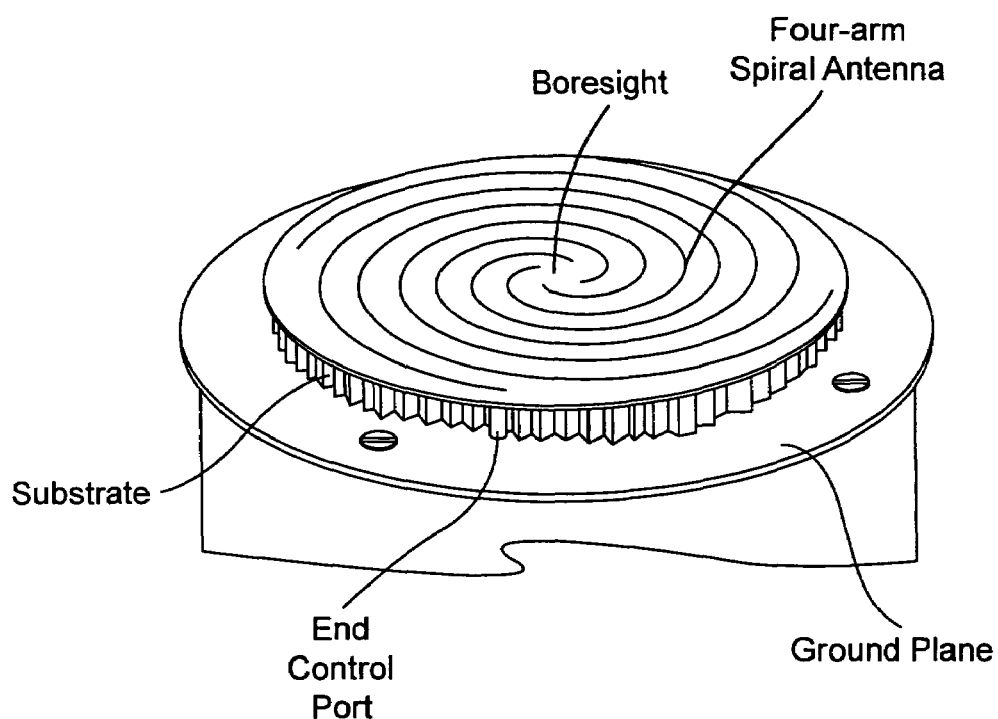
FIG. 4(A) and FIG. 4(B) are pictures of an actual four-arm spiral antenna with four feed ports, and eight control ports (four inner control ports and four end control ports).
Figure 4B:
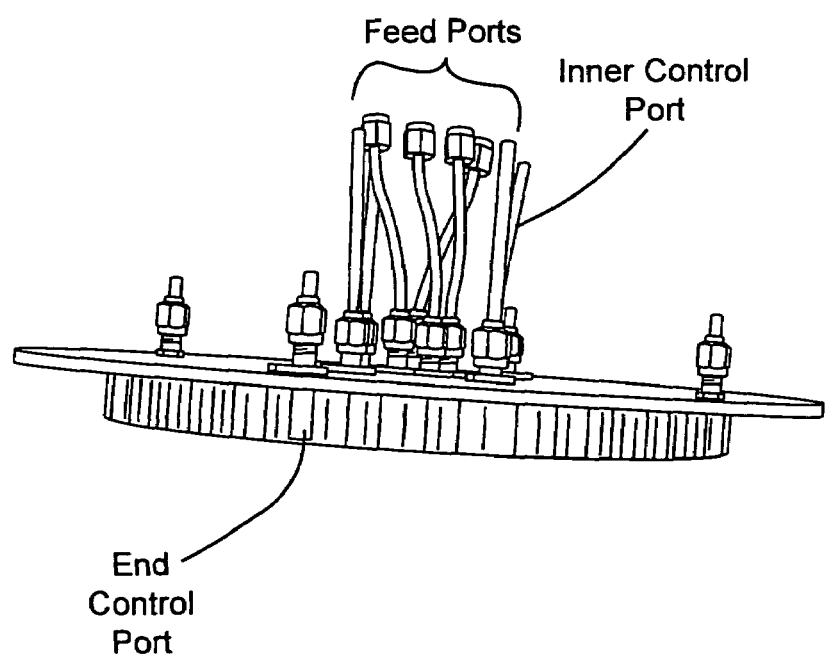

The material used for a printed antenna element may generally be copper, but other conductive materials can also be used. The substrate may generally be of dielectric material such as Duroid®. The panel is normally and typically placed above a conductive panel that forms a ground plane, and the space between the panel upon which the antenna is printed and the ground plane, if any, may be filled with a further dielectric material FIG. 4(A). Given these footprint constraints, the microstrip geometry, and the properties of this dielectric material, the height of the element above the ground plane should preferably be chosen to best tune the antenna over the frequencies of interest. The antenna can be electrically connected to one or more feed and control ports at suitably chosen points on the antenna element (FIGS. 4(A) and 4(B)). In general, feed ports may be attached to the RF front-end electronics prior to the receiver. These electronics may include a mode-forming network like a Butler matrix. In the context of the above description, it should be readily understood that while the antenna as described here is in a planar configuration, this antenna could be designed conformally to a convex or concave shape. In this situation, reference to a "plane" or a surface that is "flat" would be generalized to imply simply a continuity of surface, whether curved or flat.

The physical structure of the antenna system described here can vary to meet the size and cost constraints of the platform upon which the antenna is placed. A common feature of all these antenna systems is the presence of electronically adjustable loads whose function is either to apply a controllable phase shift to the currents flowing on a certain section of the antenna, or to reduce reflections. Another common feature of all antennas of this type is a means for adjusting the impedance presented to the antenna by the control loads via an electrical or optical signal. This signal can be generated automatically in response to some measured indication of receiver performance, or the control signal can be applied manually.

Control Loads

Control circuits can be electrically connected to the antenna element at the appropriately located control ports. In a lumped-element RF circuit, the impedance of each element can have an effect on the current flowing in the circuit. It stands to reason, then, that the impedance of an element attached to an antenna at a control port will impact the currents that flow on the antenna. Because the radiation pattern of an antenna is completely determined by the currents flowing on the antenna, attaching lumped impedance components (referred to in this document as "control loads" or simply as "loads") to the antenna will affect the radiation (reception) pattern of the antenna. If an electronically adjustable impedance, rather than a fixed one, is attached to the antenna, the tuning and radiation (reception) pattern of the antenna can be controlled by an external signal. This mechanism, combined with an apparatus for setting the impedances to be applied to the antenna via a control signal, results in an antenna that can adjust its electrical characteristics in response to its operating environment. Loads placed within the antenna aperture can be comprised of any electrical or electronic circuit or component that is capable of changing the current distribution of the antenna.

As those in the art will appreciate, the herein described loads are connected to "driven element(s)" of the antenna radiating element structure(s) in accordance with well known definitions set forth in IEEE Std 145-1993:
  a. Radiating Element. A basic subdivision of an antenna that in itself is capable of radiating or receiving radio waves.
  b. Driven Element. A radiating element coupled directly to the feed line of an antenna.
  c. Parasitic Element. A radiating element that is not connected to the feed lines of an antenna and that materially affects the radiation pattern or impedance of an antenna, or both.

Figure 5:
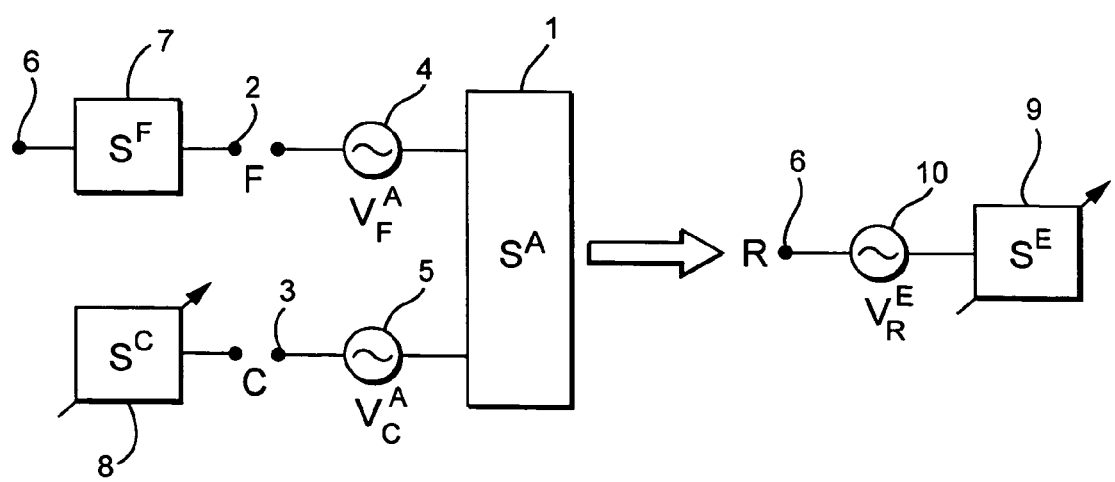
FIG. 5 depicts the IS/DF system as a microwave network.

The diagram in FIG. 5 shows an antenna, represented by its scattering matrix ($S^A$), connected to a receiver port (R) through a feed network ($S^F$) and to a variable control network ($S^C$) through the control ports (C). Straightforward network analysis will show that from the perspective of the receiver, the system described above and shown to the left in FIG. 5 is equivalent to an antenna that has a controllable scattering matrix ($S^E$) (shown to the right in FIG. 5). Hence, by changing the values of the control loads the fundamental characteristics of the antenna can be controlled in a desired manner. The actual load values needed for a given response can be calculated or optimized using conventional network analysis and optimization techniques.

Figure 6:
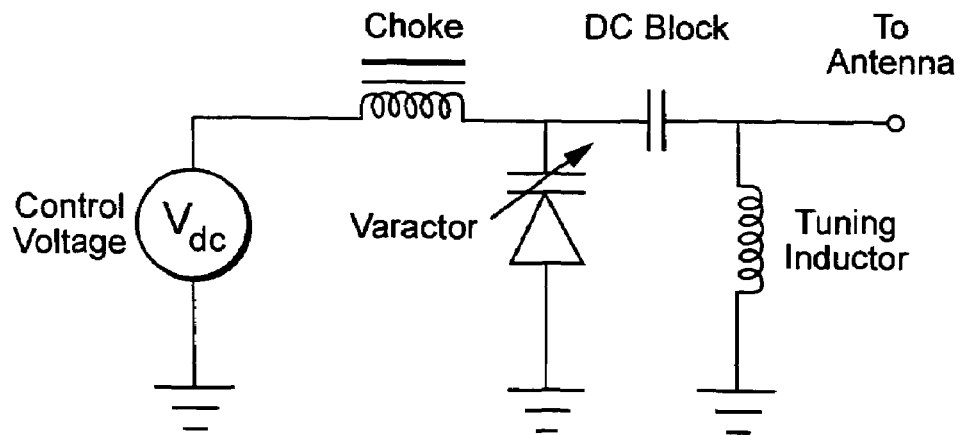
FIG. 6 shows the circuit diagram of an exemplary reactive control load.
Figure 7:
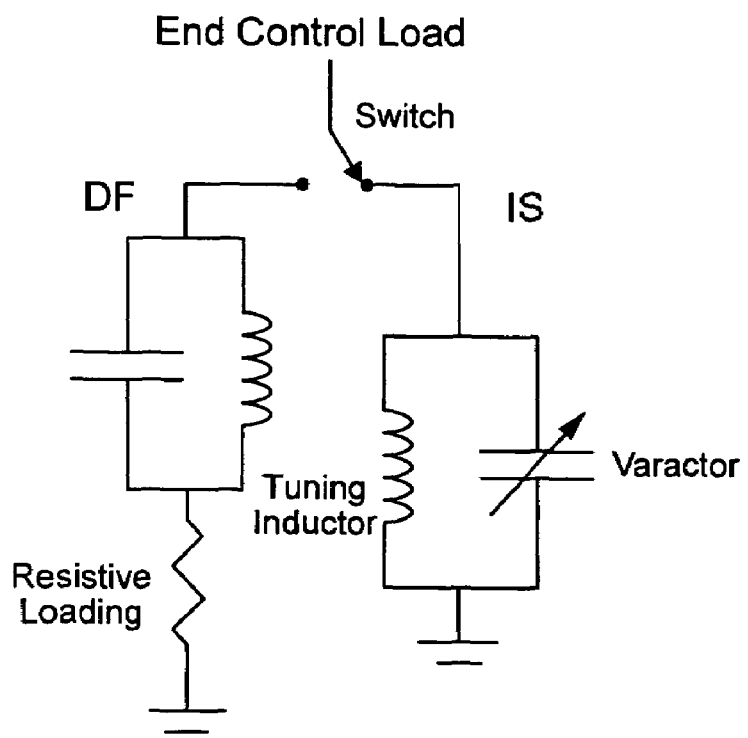
FIG. 7 shows the circuit diagram of a control load for use in an IS/DF system that is to be placed at or near the end of the spiral antenna arms.

Like the physical structure of the antenna element, the design of the control loads and their locations may vary based on the application for which the antenna system is designed. A load can be as simple as a resistor, capacitor, inductor, or a coaxial line of appropriate length. Alternatively a load can be a more complex, variable circuit or device such as a varactor (FIG. 6). Of particular interest for single-aperture IS/DF systems are variable loads with multiple states. For example a load may be comprised of a fixed or variable reactive subsystem (varactor) and fixed or variable resistive subsystem (FIG. 7). The purpose of reactive loads is to disrupt the current flow of the antenna in a desired manner for either interference rejection or direction-finding. Resistive loads are used to reduce unwanted reflections in order to improve direction-finding performance.

These exemplary load circuits are essentially (R-) L-C ((Resistor-) Inductor-Capacitor) resonators, where the capacitor used is a reverse-biased varactor diode. A schematic of one realization of the control load circuit with the resonant elements in parallel is shown in FIG. 6. The varactor diode is designed to resonate with the tuning inductor at a central frequency of interest, providing a large variation in the impedance presented to the antenna for a small change in the capacitance of the varactor diode. For control load circuits placed on antennas designed to operate at higher frequencies, the tuning inductor will often be comprised of a transmission line rather than a lumped component. Two other lumped components are typically necessary for realization of the circuit; a blocking capacitor used to prevent the DC control voltage from biasing the antenna, and a large inductor (an RF choke) used to electrically decouple the antenna element from the wire carrying the DC control voltage to the control load at high frequencies.

Reference Signal Generation

We have thus far described an antenna whose tuning and reception (radiation) properties can be controlled via a command signal. When the system is in DF mode, it may be desirable to fix the antenna patterns so that angle-of-arrival measurements can be taken. This is primarily due to the fact that lookup tables are necessary to determine the AOA. However, it may be desirable to have several sets of DF loads depending upon the mission geometry and timing. In this case an external reference signal provided by the user may be used to switch between the different sets of DF loads.

In contrast, when the system is in IS mode, it may be necessary for the system to react to changes in the signal environment. We will now describe means for generating this signal, resulting in antenna systems that can automatically adjust to a dynamic signal environment. Alternatively, IS systems can be designed that switch between several predetermined IS states in response to commands from the user. The method for applying these control signals to the antenna can vary depending upon the application.

A simple application of the antenna described above is one in which control signals are generated by commands from the user. In this application, the user can adjust the voltages applied to the control loads directly, for example with a separate knob or switch to set the voltage applied to each load. Alternatively, a single control could allow the user to switch the entire set of control loads to one of several predetermined states.

An example of such an application is one in which a single antenna is desired that can concentrate gain either at high elevation angles or at low elevation angles according to commands from the user. Sets of control voltages are developed through modeling and experiment that, when applied to the control loads, produce the desired patterns for each switch setting. A switchbox is designed to produce these sets of voltages, outputting the signals to a set of cables, which are connected to the control loads. The radiation (reception) pattern of the antenna can then be controlled by a user-operated switch.

An alternate application of the antenna described above is one in which control signals are generated automatically by a feedback mechanism. This feedback mechanism senses some metric of receiver performance, and seeks to optimize receiver performance as indicated by this metric by adjusting the control signals. The metric of receiver performance, or, in general, some function of several metrics of receiver performance, forms a goal function for the optimization process. By recursively executing one of a number of possible numerical optimization algorithms, the feedback mechanism will converge to a set of control load signals that, when applied to the control loads, optimize receiver performance according to this metric.

An example of an antenna whose tuning and radiation properties can be controlled automatically is an antenna designed to reject interference while receiving spread spectrum signals. A sensor attached to the receiver measures the magnitude of the power within the band of interest that is delivered to the receiver by the antenna. The feedback mechanism in this case consists of a processor that notes the current power level as sensed by the receiver, and through a recursive process tries to minimize it. Minimizing the raw power seen at the receiver works well for interference rejection in spread spectrum systems, because the power level of the desired signal at the receiver front-end is often below the thermal noise floor over the signal bandwidth. For maximum interference mitigation and receiver performance, a null in the radiation (reception) pattern of the antenna should be created in the direction of any power source that is distinguishable above the thermal noise floor. In this example, the feedback mechanism will find control voltages that, when applied to the control loads, will cause the antenna to have a radiation (reception) pattern with nulls in the direction of interfering sources. An antenna that reconfigures itself to optimize GPS reception in the presence of jammers would be an example of this kind of system.

Another example of an antenna whose tuning and radiation properties can be controlled automatically is simply an antenna designed to maximize antenna gain in the direction of a desired signal. In this case, the receiver provides some metric of the strength or quality of the received desired signal. The feedback mechanism in this case may use a processor that notes the current signal strength metric and recursively tries to maximize it. In this example, the feedback mechanism will find control voltages that, when applied to the control loads, will cause the antenna to have a radiation (reception) pattern with maximum possible gain in the direction of the desired signal. In cases where multipath signals cause destructive interference at the receiver, the load voltages may have the effect of producing nulls in the directions of interfering paths.

Yet another example of an antenna whose tuning and radiation properties can be controlled automatically is an antenna designed to reduce the total amount of power transmitted by narrowing the radiation pattern of the antenna. This process is distinct from maximizing the gain in the direction of the desired signal as described in the previous example. In this example, the goal is to minimize the gain in directions away from the desired signal, creating a null in the pattern of the antenna in a direction opposite from that where radiation (reception) is desired. This decreases the amount of power that must be transmitted in order to achieve a given amount of gain in the direction of interest. Such an antenna also reduces the amount of interference that the antenna causes to other users in the wireless system.

The drawings are intended to illustrate presently preferred exemplary embodiments of the invention only and not for the purpose of limiting same, basic block diagram of an exemplary interference suppression and direction-finding (IS/DF) system is shown in FIG. 1. The drawing shows a single-aperture electronically reconfigurable antenna (ERA) with direction-finding capability (1). The DF ERA contains within its aperture at least one feed port (2) and at least one control port (3). The signals from the feed ports are connected to a feed network (4) that combines them to obtain one or more fundamental modes of the antenna or, equivalently, one or more antenna patterns that can be used to receive a desired signal or to compute the angle-of-arrival of a signal-of-interest. The type of feed network depends upon method of direction-finding used, e.g. amplitude-comparison, phase-comparison, or amplitude-phase comparison, and whether or not the DF system will be monopulse or sequential. The output of the feed network is then split with one branch going out to the external receiving system (5) and the other branch going to the RF front-end electronics (6). The goal of the RF front-end is simply to provide filtering and to prepare the signals for sampling by the IS/DF controller (7). In one embodiment, the RF front-end (6) and IS/DF controller (7) are absorbed by the external receiver (5), thereby eliminating the need to split the signals output from the feed network and eliminating duplicate hardware and functionality.

The IS/DF controller (7) has several functions. First it controls (8) the operating state of the system by selecting (9) the load circuits, i.e., loads for interference suppression (10) or direction-finding (11). If the system is operating as an interference suppression unit then the IS/DF controller may vary (12) the IS loads (10) to minimize the input power of the signal-of-interest provided by the RF front-end (6). This can be accomplished through any number of genetic optimization algorithms or can be as simple as a gradient decent or a random search algorithm. If the system is operating in DF mode, and depending on the circumstances, the IS/DF controller (7) may select (13) from one or more sets of fixed DF loads (11). The selection of the DF loads could be based on a priori knowledge of the location of the interfering signal or some other external input. The IS/DF controller also hands the (analog or digital) DF input signals provided by the RF front-end (6) to the angle-of-arrival (AOA) estimation algorithm (14). The AOA estimation algorithm uses the input signals to compute the measured elevation ($\theta$) and azimuth ($\phi$) incidence angles of the signal-of-interest. These angles are output to the receiving system (15).

Depending on the application the IS/DF controller may or may not accept external command inputs (16). These inputs can be as simple as commands to provide either IS protection or AOA measurements. Alternatively, the IS/DF controller may decide to switch from one operational state to another based on the level of interference. The command inputs (16) can also be external reference signals that are used as inputs to the feedback control law that dynamically and continuously determines the IS load values. Such command inputs may include the bit error rate (BER) of the external receiver, or some other quality-of-service (QoS) signal including, but not limited to, the signal-to-noise ratio (SNR), the carrier-to-noise ratio ($C/N_0$) or the jammer-to-noise ratio (J/N). The command inputs may be a discrete state or mission time that is used to select between a set of fixed IS loads. In the absence of an external command input, the IS/DF controller (7) can through feedback simply guide the load values to minimize the measured power levels of the signals provided by the RF front-end (6). It is apparent that the specific application will determine the precise design of the RF front-end and IS/DF controller.

The accuracy of most DF systems degrades beyond a certain point based on the incident geometry of the signal-of-interest. In some cases there are multiple AOA solutions possible based on the measured signals. It is possible to significantly improve the performance of such systems when the IS/DF system is operating on a moving platform and has access to the navigation solution (17) of the onboard navigation computer. In such cases the updated position and velocity vectors of the DF/IS system along with the estimated location of the interference source can be used to correct initial AOA estimates and to eliminate candidate AOA solutions. This unique feedback loop makes use of any number of multiple-hypothesis-tracking algorithms to update the confidence of each candidate AOA solution.

Antenna Design

The specific choice of direction-finding antenna depends primarily on the application. The application in this case is that of a GPS antenna with interference suppression and direction-finding capability. The intended platforms are small GPS guided munitions. FIG. 2 illustrates the preferred structure of a four-arm Archimedean microstrip spiral antenna. The antenna structure is comprised of a ground plane (1), a dielectric substrate (2), and the antenna element comprised of four arms (3). The counterclockwise direction of the spiral arms is selected to receive primarily right-hand-circularly-polarized (RHCP) GPS signals. The antenna shown has four feed ports (4), four end control ports (5), and four interior control ports (6) for a total of eight control ports, or a combined total of 12 ports. The number of feed ports is determined strictly by the number of spiral arms and the number of control ports is a design parameter. The location of the control ports is partially restricted by the four-fold symmetry requirement, i.e., a rotation of 90° about the center of the antenna yields no changes in the antenna structure. Eight control ports were selected based on simulations that indicated that good IS and DF performance could be achieved without overburdening the control algorithms. In general, the processing power required by the controller can grow exponentially with the number of loads.

FIG. 3(A) illustrates the gain pattern of the four-arm spiral antenna. Both Mode 1 (M1) and Mode 2 (M2) RHCP and LHCP (left-hand-circularly-polarized) gains are shown. When the system is in DF mode the measured ratio of M1 to M2 is used to determine the elevation angle by comparing it to values found in a lookup table. The azimuth angle is estimated by measuring the relative phase of the two modes (FIG. 3(B)) and by comparing it to a previously compiled lookup table. The lookup tables are generally created by ignoring the LHCP component of the antenna pattern. AOA errors are therefore greater for polarizations that are not RHCP.

The AOA performance of the system depends on the size of the spiral antenna system and larger systems perform better. The minimum spiral antenna diameter ($d_1$) required for AJ GPS operation is $$d_1 \geq \frac{1}{\pi\sqrt{\varepsilon_r}}\lambda = \frac{1}{\pi\sqrt{\varepsilon_r}}\frac{c}{f} \qquad (1)$$

where $\lambda$ is the wavelength and f is the frequency of the signal of interest. The speed of light is denoted by c and $\varepsilon_r$ is the dielectric constant relative to free space. An anti-jam (AJ) GPS antenna operating in the L1 band (1575.42 MHz±10 MHz) and using a substrate with $\varepsilon_r \cong 1$ requires a diameter of at least 2.4-in (6.06-cm). The interference suppression null depth will depend on the actual diameter of the antenna. For direction-finding the diameter ($d_2$) of the antenna needs to be at least $$d_2 \geq 2d_1. \qquad (2)$$

Hence, a DF antenna operating at L1 will require at least a 4.8-in (12.1-cm) diameter. For AJ GPS/DF operation in both the L1 and L2 (1227.6-MHz) frequency bands, a spiral antenna with at least a 6.1-in (15.6-cm) diameter would be necessary for $\varepsilon_r=1$. Relative to wavelength, $$\frac{d_2}{\lambda} \geq \frac{2}{\pi\sqrt{\varepsilon_r}} \cong 0.64 \text{ for } \varepsilon_r = 1.$$

Hence, the largest dimension of the IS/DF antenna need not be any larger than about three-quarters wavelength. If an IS/DF antenna with a 5-in diameter is required, then it will be necessary to use a substrate with $\varepsilon_r=1.5$. While the use of higher dielectrics allows for a smaller antenna diameter for the purposes of impedance matching, the AJ GPS and DF performance of the system will be somewhat diminished.

Control Loads and Port Locations

The control circuits attached to the control ports determine the fundamental characteristics of the antenna system. This is easily understood through RF network analysis and is illustrated by FIG. 5. The figure depicts the antenna by its scattering matrix, or S-Parameters ($S^A$) (1), its feed (F) ports (2), and its control (C) ports (3). A reference field incident upon the antenna at some angle of interest excites a voltage $V^A$ at the ports of the antenna. This voltage can be broken up into two parts, $V_F^A$ (4) and $V_C^A$ (5). The first part, $V_F^A$ (4), represents the voltage as seen by the feed port (2) which is connected to receiver (6) by the way of the feed network (7). The second part, $V_C^A$, represents the voltage as seen by the control port (3) and the variable control network (8). The control network is represented by its scattering matrix $S^C$ and designed to be variable by adjusting the biases on the control loads. It can be shown that from the perspective of the receiver (6) the network shown on the left of FIG. 5 is equivalent to the one shown on the right. This equivalent network is represented by the variable scattering matrix $S^E$ (9) and the equivalent voltage at the receiver $V_R^E$ (10). Hence, we can control the fundamental properties of the antenna by carefully selecting the location and values of the control loads.

The location of the control ports depends completely on the class of direction-finding antenna and its mode of operation as well as the design goals for the IS/DF system. Each DF antenna class has well known resonance characteristics that depend on the antenna mode being excited. In the particular case of four-arm spiral antennas, the resonance locations for each of the four antenna modes are well known (Corzine et al. [1990]). While all four radiation modes (M1, M2, M3, and M4) can be used for direction-finding (Penno et al. [2001]), only two modes (M1 and M2) are required. Mode 1 (M1), or the Sum Mode (Σ), resonates at a radius of 0.5λ/π from its center where the effective signal wavelength is λ. In contrast, Mode 2 (M2), or the Difference Mode (Δ), resonates at a radius of λ/π. These locations correspond to circumferences of m·λ where m is the mode number. In reality the actual resonances occur in a region about these circumferences. Therefore, the location of a control port depends on the radiation mode that needs to be adjusted.

Since the AJ GPS/DF antenna in DF mode is primarily an RHCP antenna, only the RHCP gain of the antenna is used to create lookup tables for direction-finding. Hence, any LHCP component of the antenna gain produces AOA errors. It is well known, for example, that reflections are created when the ends of the spiral arms are not properly terminated. Furthermore, when reflections do occur, they corrupt the purity of the (RHCP) polarization and lead to poor DF performance. In order to reduce the LHCP component of the antenna gain for DF mode, it is necessary to place control ports no closer to the center than a radius of λ/π. This is to allow the antenna to support M2 mode while reducing the majority of reflections. In order to reduce reflections, these "end" loads need to have a resistive component. Furthermore, if Mode 3 is not going to be used for DF, the existence of an M3 component is undesirable. Therefore, the resistive end loads should be placed prior to a radius of 1.5λ/π. Moreover, in order to suppress the excitation of M3, the maximum spiral circumference should be less than 3λ. This analysis leads to the conclusion that the resistive end loads should be placed at $r_{EL}$ where $$\frac{\lambda}{\pi} < r_{EL} < r_{max} \text{ and } r_{max} < 1.5\frac{\lambda}{\pi}.$$

The primary concern with anti-jam GPS (IS) is the tradeoff that occurs between nulling capability and antenna efficiency. The efficiency of the antenna can deteriorate as the antenna loads are varied to produce nulls in the direction of the jammer. Furthermore, resistive loading reduces the efficiency of the antenna. This implies that when interference suppression is the primary goal, then resistive loading is not desired and, in fact, is counter to the desired goal. Antenna theory states that all achievable antenna patterns are a weighted sum of the fundamental modes of an antenna. In order to create polarization-sensitive nulls in the direction of an interfering signal it is necessary to excite and control as many of the fundamental modes as possible. In contrast to DF, the IS state benefits from the impurity of the mode of interest. If Mode 1 is used for AJ GPS then it is desirable to excite the second (M2) and third (M3) modes of the antenna whenever possible. Therefore, the end loads required for IS should not have any resistive components. Hence, this requirement forces us to use two sets of loads for the end ports of the antenna: the DF end-loads are resistive, while inner-loads are reactive (FIG. 7). In contrast, all eight IS loads are reactive.

Furthermore, if Mode 1 is going to be the primary mode used for AJ GPS, then it would be appropriate to place interior control ports somewhere in the vicinity of the Mode 1 resonance area. However, there are further performance tradeoffs that need to be considered. For example, if the interior control ports are placed too far away from the center, the control loads will lose control authority over the Mode 1 pattern. In contrast, if the ports are placed too close to the center, then the system becomes too sensitive and could detune from the desired resonant frequency resulting in reduced efficiency. Hence, the interior control ports should be placed at $r_{IL}$ where $$0.1\frac{\lambda}{\pi} < r_{IL} < \frac{\lambda}{\pi}.$$

Interference Suppression and Direction-Finding Electronics

In the preferred embodiment the IS/DF system is a capable of rapidly switching between its two operational states (IS and DF). This can be accomplished by simply switching from one set of control loads to another. In the first state (IS), the system operates as a controlled reception pattern antenna, i.e., the loads are variable, while in the second state (DF) the system operates as a fixed reception pattern antenna (FRPA), i.e., the loads are fixed. When in interference suppression mode one distinguishing feature of this electronically reconfigurable antenna (ERA) system is that it provides polarization-sensitive null steering (PSNS). That is to say that the system adjusts its polarization in the direction of the incoming signal to be orthogonal to that of the incoming signal. Hence, the system permits other signals through while blocking the undesired signal.

Figure 8:
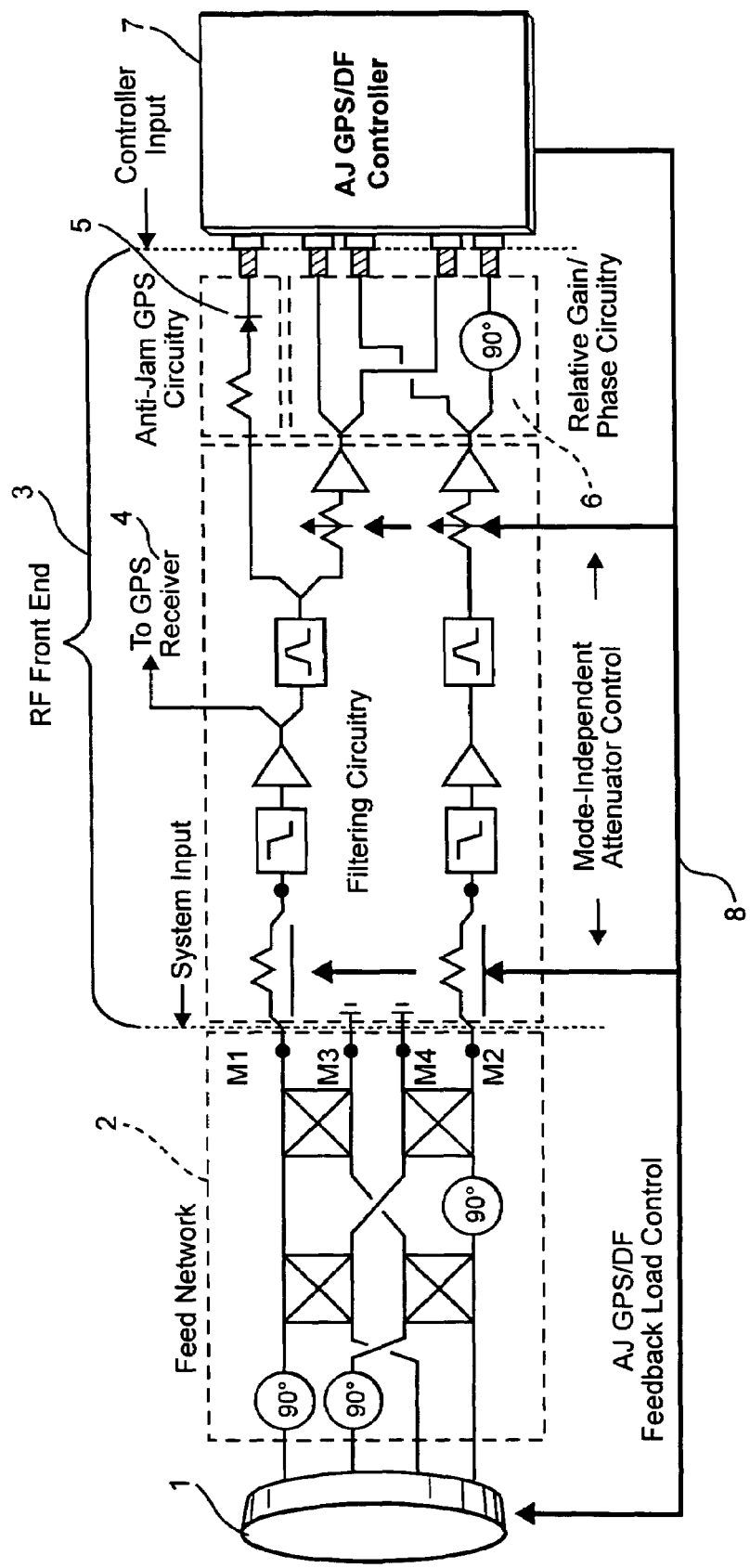
FIG. 8 illustrates the AJ GPS/DF system schematic.

A circuit schematic of the AJ GPS/DF system is shown in FIG. 8. We note that the four feed ports of the spiral antenna (1) are connected to the standard feed network (2) for four-arm spiral antennas. The feed network forms the four fundamental antenna modes with Mode 3 and Mode 4 terminated with a 50Ω load. Modes 1 and 2 are inputs to the RF front-end (3) electronics which filters, amplifies, and attenuates the two signals and splits Mode 1 into two RF branches with the first branch leading to the GPS receiver (4). The remaining M1 signal is split once again with one branch feeding the anti-jam GPS circuitry (5), and the remaining M1 signal along with the M2 signal feeding the relative gain/phase circuitry (6). While the AJ GPS circuitry rectifies the M1 signal in preparation for a power measurement, the relative gain/phase circuitry creates two copies of the M1 and M2 signals while causing an additional 90° phase delay in one copy of the M2 signal. These signals are used by the controller (7) to vary the control loads through feedback (8).

Figure 9:
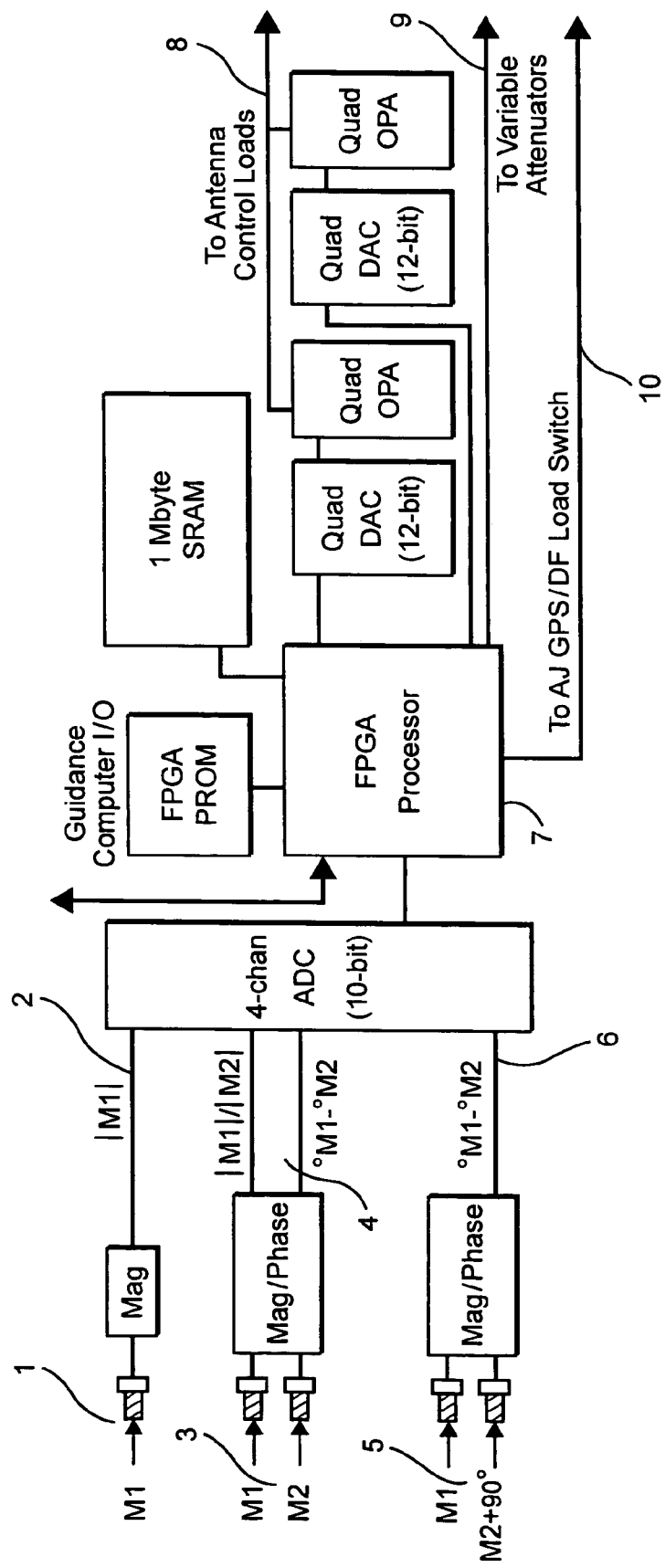
FIG. 9 depicts the AJ GPS/DF system controller board.

The controller architecture is shown in FIG. 9. Three copies of the M1 signal are provided to the controller. The first signal (1) is rectified and a power measurement is taken (2). This measurement is used as the reference signal for IS. Hence, in AJ GPS mode, the objective of the system is to minimize the measured power of the M1 input signal. Additional copies of the M1 and M2 signals are used to measure relative gain and relative phase between M1 and M2. Two sets of relative gain and phase measurements (3 & 5) are necessary to obtain a 360° relative phase measurement (4 & 6). This requirement is imposed by the hardware selected for the relative gain and phase measurement. Next, all relative gain and phase measurements are sampled and sent to the FPGA processor (7) for further refinement. In AJ GPS mode, the magnitude of the M1 signal is used to control the variable loads on the control ports of the antenna (8). In DF mode, the relative gain and phase measurements are compared to lookup tables to determine the elevation and azimuth angle-of-arrival estimates. The input signals are attenuated to remain within the dynamic range of the system (9) and the system switches (10) between DF and IS modes depending on the M1 input power level.

Angle-of-Arrival Estimation

One approach to estimating the bearing angles is the utilization of the a priori known ratio and phase difference of $M_1$ and $M_2$. Let the complex ratio $(R_{2,1}(\theta,\phi))$ of Mode 2 to Mode 1 be denoted as $$R_{2,1}(\theta, \phi) = \frac{M_2(\theta, \phi)}{M_1(\theta, \phi)} \equiv |R_{2,1}(\theta, \phi)| \exp(j\angle R_{2,1}(\theta, \phi)). \quad (3)$$

The inverse of these ratios, $R_{1,2}(\theta,\phi)$ and $r_{1,2}$, are sometimes used for convenience. Neither ratio is preferred over the other. Finding a closed-form function for the magnitude of the ratio and the phase difference of the ratio is difficult. Hence, a table of these values for different pairs of elevation and azimuth angles is created as a reference. Here $|R_{2,1}(\theta,\phi)|$ denotes the table lookup for the relative RHCP magnitude (FIG. 10(A)) and $\angle R_{2,1}(\theta,\phi)$ denotes the table lookup for relative phase (FIG. 10(B)). In order to avoid the wrapping problem, the relative phase table is stored as the sine and cosine (FIG. 10(B)) of the relative phase measurements. The complex measurement of the ratio $M_2/M_1$ is denoted by $r_{2,1}$. Once a measurement has been made, its relative gain and phase is compared with the lookup tables to obtain an estimate of the AOA.

Multi-Hypothesis Navigation Feedback for Improved Direction-Finding Performance

Figure 10A:
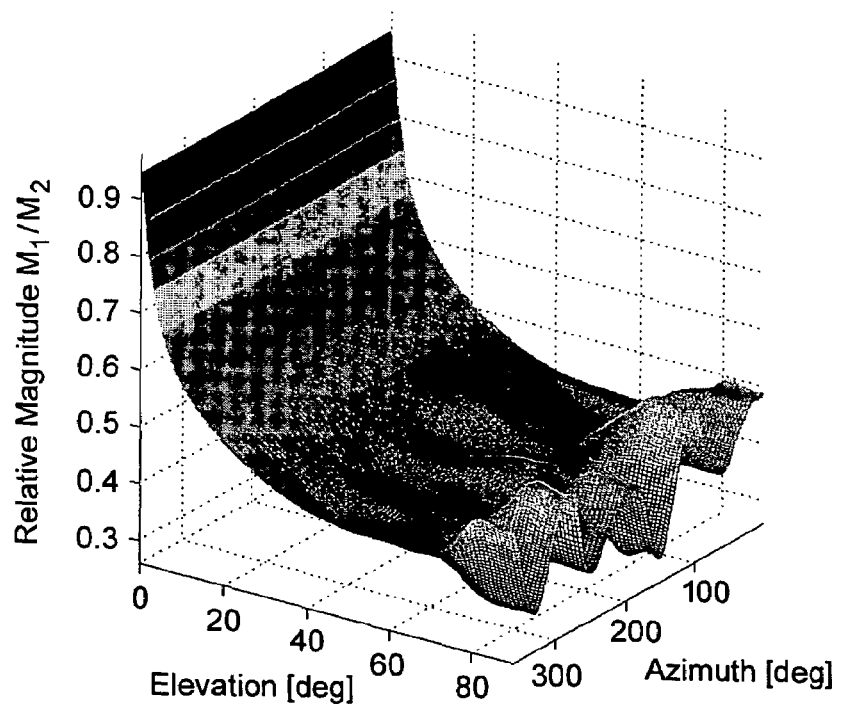
FIG. 10(A) and FIG. 10(B) show the relative gain and phase lookup tables for a four-arm spiral antenna system.
Figure 10B:
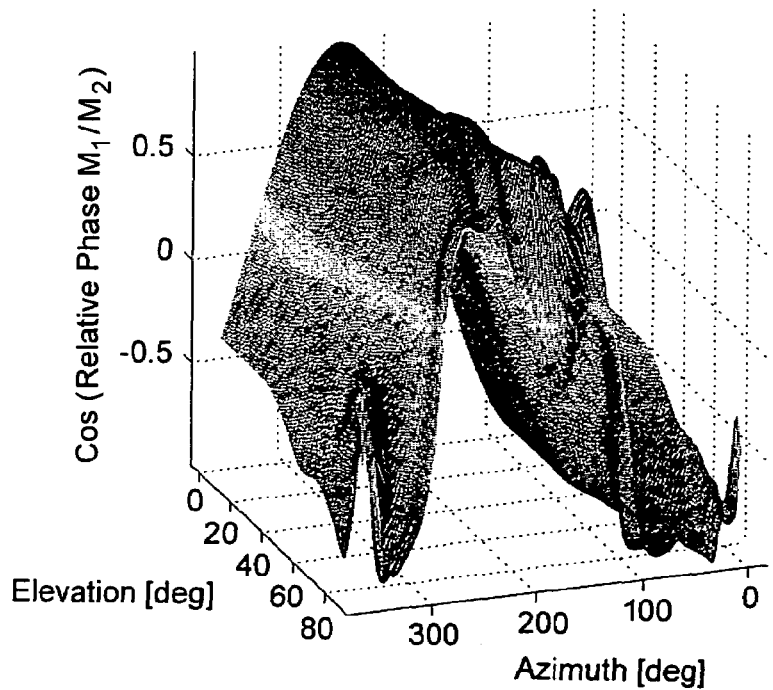
Figure 11:
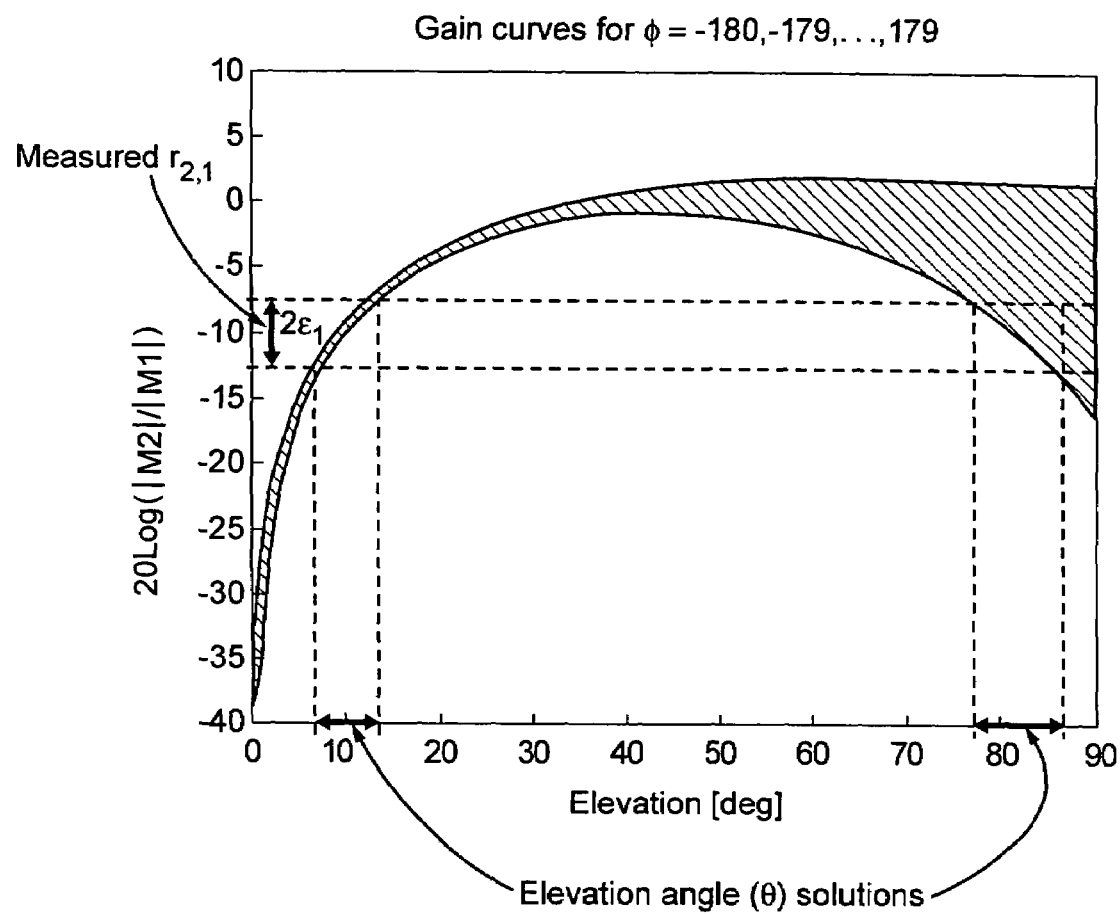
FIG. 11 shows a family of relative gain curves that can cause multiple solutions to exist for each measurement.

As shown in FIG. 10(A) the relative magnitude table can provide multiple elevation angle estimates per measurement at elevation angles beyond 30°. The relative phase tables have a similar deficiency with azimuth estimates. This situation is clarified in FIG. 11 where the (inverse) relative gain curve is plotted for all azimuth angles. Ideally this function would be monotonically increasing with elevation angle. However, as demonstrated by the figure, a unique elevation angle estimate is possible only for low elevation angles. Otherwise there are multiple elevation angle estimates for each relative gain measurement. Through the use of a multiple-hypothesis algorithm this deficiency is largely eliminated under the assumption that the IS/DF system is on a moving platform and that a guidance solution is available.

The motivation for using a multiple-hypothesis tracker results from possible ambiguity in the angle-of-arrival estimation. Suppose that two or more sets of bearing angles, $(\theta_1,\phi_1), (\theta_2,\phi_2), \ldots, (\theta_m,\phi_m)$, account for the measured values. How is the "correct" bearing measurement determined? One approach is to use a multiple-hypothesis tracker. The multi-hypothesis tracker spawns a separate filter for each possible measurement to track association. Note that the number of hypotheses increases exponentially with the number of measurements so some pruning method is necessary. Each hypothesis is represented by a track and a probability that that hypothesis is the correct one. As the probabilities of the hypotheses that are not consistent with the measurements (over time) become increasingly smaller, the correct hypothesis will survive. Since each hypothesis is conditioned on a unique sequence of measurements associated to the track, this is truly a multiple-hypothesis-tracking algorithm (Blackman et al. [1999]).

Figure 12:
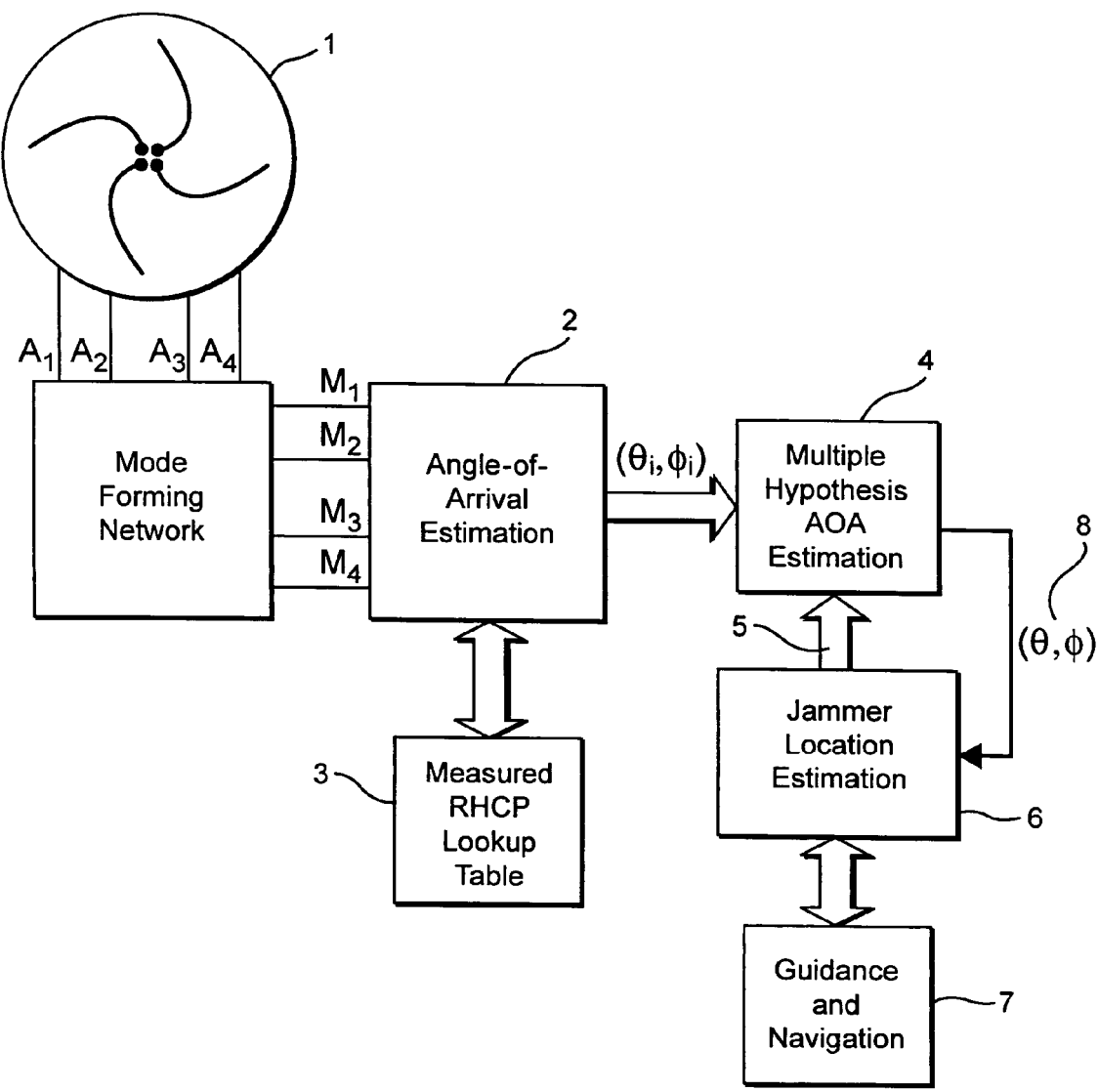
FIG. 12 is a block diagram of the multiple hypothesis angle-of-arrival estimation scheme.

FIG. 12 shows the block diagram of the system when a multiple-hypothesis tracker is implemented in association with an AOA estimation algorithm. The feed ports of the spiral antenna (1) are first fed into the mode-forming network (which includes the feed network and the RF front-end). The output of the mode-forming network is then used by the AOA estimation algorithm (2) to provide AOA measurements through the use of RHCP lookup tables (3). All possible AOA measurements are provided to the multiple-hypothesis AOA estimation algorithm (4). The multiple-hypothesis AOA estimation algorithm (4) uses jammer location estimates (5) along with platform position to check the consistency of the angle estimates provided by the AOA estimation algorithm (2). Angles that are inconsistent with jammer location estimates are dropped. The jammer localization algorithm uses the guidance and navigation solution (7) along with the filtered AOA estimates (8) to compute estimates of the jammer location. A jammer location estimate is generated for each AOA estimate. This is achieved through the use of well known bearings-only tracking algorithms (Grossman [1994]).

Figure 13:
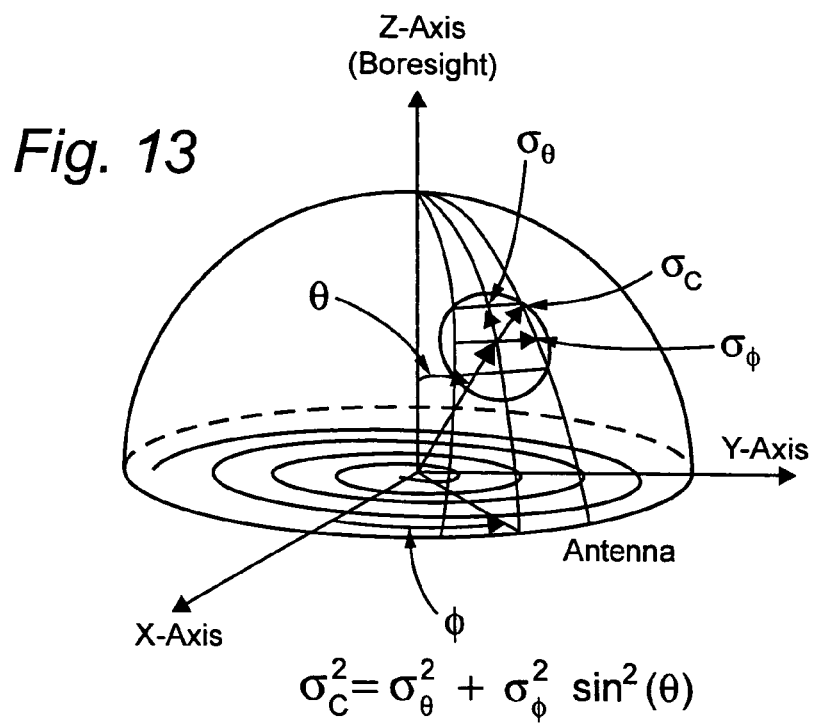
FIG. 13 defines the coordinate system and the composite angular error.
Figure 14:
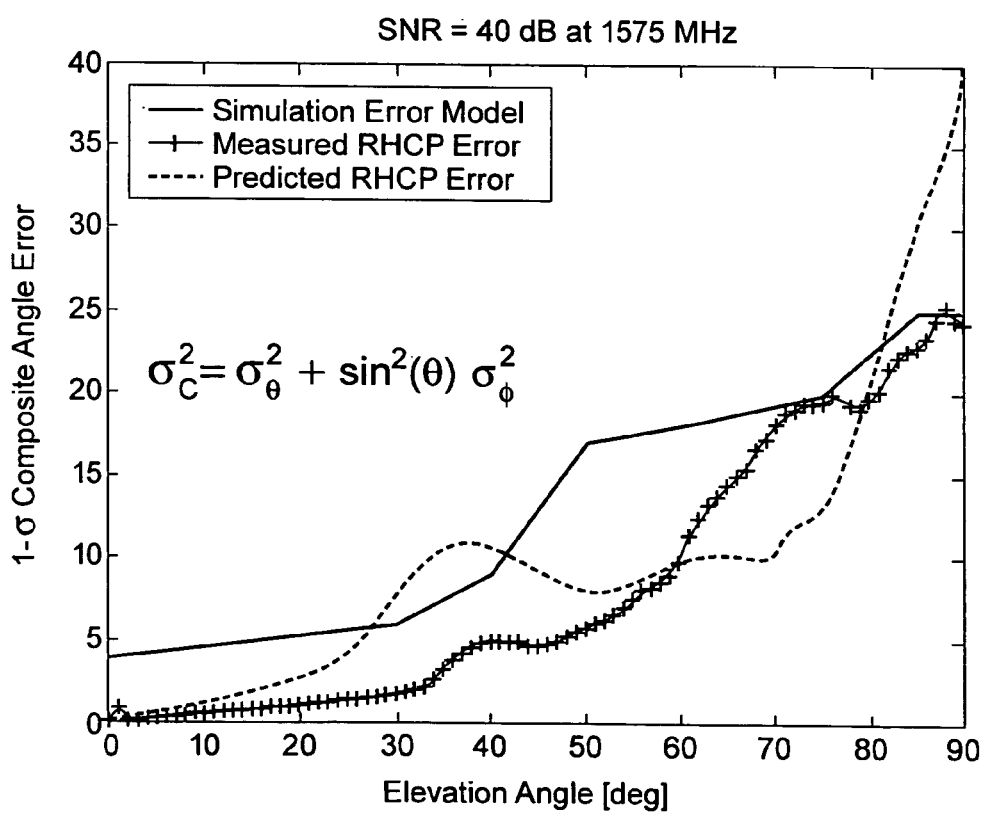
FIG. 14 illustrates the angle-of-arrival accuracy of the AJ GPS/DF system.

FIG. 13 shows the angle-of-arrival coordinate system and defines the composite angle error (CAE) as a function of elevation and azimuth angle errors. The CAE is used to compare the AOA performance through a single numerical metric. FIG. 14 shows the measured and predicted composite angle error as a function of elevation angle for RHCP signals. As can be seen, the useful field-of-regard (FOR) of the spiral antenna has been significantly increased from the generally agreed upon ±30° from boresight to greater than ±60°.

Interference Suppression Performance

Figure 15:
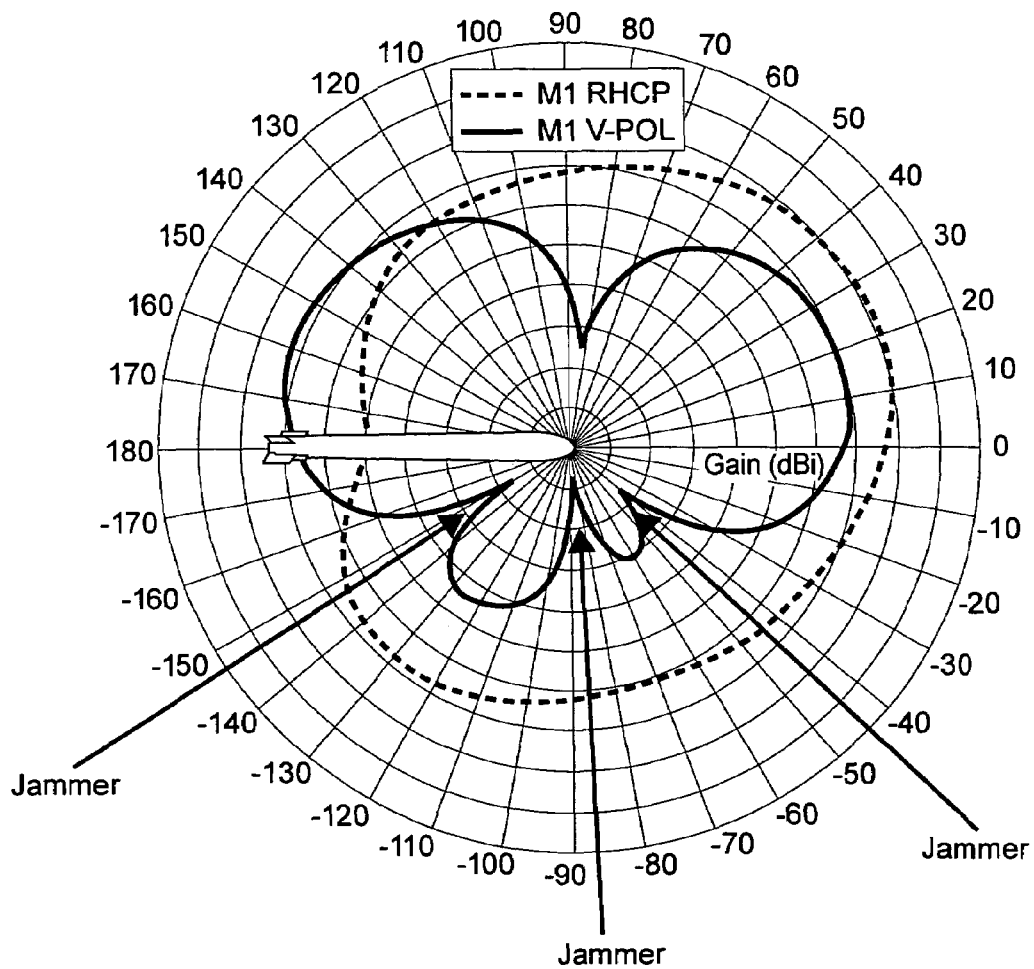
FIG. 15 illustrates the AJ GPS performance of the system in response to multiple jammers.

FIG. 15 shows a typical IS response of the system to multiple linearly polarized jammers. While the actual null depths have been left off for security reasons, it is apparent that the RHCP gain of the system is still largely intact while the vertical polarized gain of the system has been significantly reduced in the direction of each jammer.

As those in the art will appreciate, changes and modifications may be made in the above-described exemplary embodiments while yet retaining at least some novel features and advantages. Accordingly, all such changes and modifications are intended to be included within the scope of the appended claims.

What is claimed is:

1. An antenna system for use in interference suppression and direction finding, said system comprising:
   a direction-finding antenna having at least two fundamental modes and including at least one loaded driven element capable of producing angle-of-arrival measurements for received signals and wherein each said loaded driven element includes at least one load port;

a plurality of load circuits respectively connected to the load ports and embedded either in the radiation aperture of the antenna or behind a ground plane of said antenna, said load circuits having impedance characteristics that are either (a) predetermined and fixed or (b) variable by changing the values of electrical control signals applied to active components within the load circuits; and a controller configured to select for use a subset of said load circuits to effect operation in at least one of said fundamental modes and which updates control settings of the selected load circuits having variable impedance and belonging to said subset, if any.

2. The antenna system of claim 1, wherein the controller is configured to dynamically select the said subset and to adapt control settings of the load circuits having variable impedance and belonging to said subset, if any, and, thereby to adapt impedance characteristics of the antenna to produce front-end control of the received signals.

3. The antenna system of claim 1, wherein said fundamental modes and said at least one loaded driven element can be used to effect operational states that include: (a) direction finding, (b) interference suppression, and (c) combined direction finding and interference suppression.

4. The antenna system of claim 1, wherein the load circuits connected to the load ports of said at least one loaded driven element are configured to cause the antenna system to be resilient to detuning while at the same time enabling substantial adaptation of impedance characteristics of the variable load circuits to achieve improved performance optimization for said at least two fundamental modes of the antenna system.

5. The antenna system of claim 1, wherein angle-of-arrival estimates of received signals are generated with improved accuracy by combining based-en estimated or measured dynamics of the antenna system with said angle-of-arrival measurements.

6. An antenna system for use in interference suppression and direction finding, said system comprising:

a single aperture antenna having at least one driven element with at least two fundamental modes that can be used to derive angle-of-arrival measurements for received signals;

a plurality of load circuits embedded either in the radiation aperture of the antenna or behind a ground plane of said antenna, said load circuits having impedance characteristics that are either (a) predetermined and fixed or (b) variable by changing the values of electrical control signals applied to active components within the load circuits;

a controller configured to select for use a subset of said load circuits to effect operation in at least one of said fundamental modes and which updates control settings of selected load circuits having variable impedance and belonging to said subset, if any;

means for measuring received signal angle-of-arrival by converting measured output signals of said at least two fundamental modes of said antenna into said angle-of-arrival measurements for the received signals;

means for maintaining tracks by creating new tracks for the received signals with said angle-of-arrival measurements that are statistically inconsistent with angle-of-arrival estimates of previously existing tracks, and by eliminating said existing tracks that are statistically inconsistent with said angle-of-arrival measurements;

means for tracking and updating said existing tracks to provide estimates of the dynamics for a point-of-origin of each of said received signals based on the angle-of-arrival measurements of the received signals and measured or estimated dynamics of said antenna system; and means for estimating received angles-of-arrival by computing the angle-of-arrival estimate for said existing tracks based on relative dynamics of said antenna system and the point-of-origin of each of said received signals.

7. The antenna system of claim 1, wherein the largest dimension of the radiating aperture of said direction-finding antenna is no greater than about three-quarters wavelength at the lowest frequency of its operational band.

8. A controlled antenna system for use in interference suppression and direction finding, said system comprising:

an antenna having at least one loaded antenna driven element having at least two fundamental modes that can be used to derive angle-of-arrival estimates for received signals, wherein the largest dimension of the radiating aperture of the antenna is no greater than about three-quarters wavelength at the lowest frequency of its operational band;

a plurality of control circuits embedded either in the radiation aperture of the antenna or behind a ground plane of said antenna, said control circuits having impedance characteristics that are either (a) predetermined and fixed or (b) variable by changing values of electrical control signals applied to active components within the control circuits;

wherein said control circuits are divided into at least two subsets, with impedance characteristics of each of said subsets being dependent on whether the subset is used for (a) direction finding, (b) interference suppression, or (c) combined direction finding and interference suppression;

means for activating any selected one of said subsets of control circuits by effectively electrically connecting the selected subset to said at lest one antenna driven element while effectively disconnecting control circuits not belonging to said subset from said at least one antenna driven element; and a dynamic feedback controller which is configured to dynamically select a subset of said control circuits for activation, and which regularly updates control settings of selected control circuits having variable impedance and belonging to said active subset, if any.

9. The antenna system of claim 8, wherein said controller receives a sequence of bias estimate values and uses these to set updated voltage biases that are applied to active components in the control circuits belonging to said active subset, if any.

10. The antenna system of claim 8, wherein controller outputs are determined to obtain a maximum, minimum or a predetermined value for one or more antenna system metrics.

11. A method for controlling a single aperture antenna system for use in interference suppression and direction finding having at least one loaded driven element capable of supporting at least two fundamental modes and having a plurality of load circuits embedded either in the radiation aperture of the antenna system or behind a ground plane of said antenna system, said load circuits having impedance characteristics that are either (a) predetermined and fixed or (b) variable by changing the values of electrical control signals applied to active components within the load circuits, said method comprising:

converting antenna outputs for said at least two fundamental modes of said antenna system into angle-of-arrival estimates for received signals;

selecting a subset of said load circuits and regularly updating control settings of the selected load circuits having variable impedance and belonging to said subset, if any; and connecting said selected subset of load circuits electrically to load ports on said at least one loaded driven element while disconnecting load circuits not belonging to said subset from said load ports.

12. The method of claim 11, wherein the selecting and connecting steps adapt control settings of the load circuits having variable impedance and belonging to said subset and thereby adapt impedance characteristics of the antenna so as produce front-end control of received signals.

13. The method of claim 11, wherein said load circuits are divided into at least two subsets and wherein the selection of the subset of load circuits depends on an operational state of the antenna system including: (a) direction finding, (b) interference suppression, or (c) combined direction finding and interference suppression.

14. The method of claim 11, wherein the load circuits connected to the load ports of said at least one loaded driven element cause the antenna system to be resilient to detuning while at the same time enabling substantial adaptation of impedance characteristics of variable load circuits to achieve improved performance optimization for each said fundamental mode of the antenna system.

15. The method of claim 11, wherein the angle-of-arrival estimates of the received signals are generated with improved accuracy by combining estimated or measured dynamics of the antenna system with said antenna outputs.

16. A method for controlling a single aperture antenna system for use in interference suppression and direction finding having at least one driven element with at least two fundamental modes and having a plurality of load circuits embedded either in the radiation aperture of the antenna or behind a ground plane of said antenna, said load circuits having impedance characteristics that are either (a) predetermined and fixed or (b) variable by changing the values of electrical control signals applied to active components within the load circuits, said method comprising:

converting antenna outputs for said at least two fundamental modes of said antenna into angle-of-arrival measurements for received signals;

selecting a subset of said load circuits and regularly updating control settings of selected load circuits having variable impedance and belonging to said subset, if any;

connecting said selected subset of load circuits electrically to the at least one driven element while disconnecting load circuits not belonging to said subset from said at least one driven element;

creating new tracks for the received signals with said angle-of-arrival measurements that are statistically inconsistent with the angle-of-arrival estimates of previously existing tracks;

eliminating said existing tracks that are statistically inconsistent with said angle-of-arrival measurements;

combining said angle-of-arrival measurements and measured or estimated dynamics of said antenna system to update existing tracks and provide estimates of dynamics for a point-of-origin of each of said received signals; and computing the angle-of-arrival estimates for said existing tracks based on relative dynamics of said antenna system and the point-of-origin of each of said received signals.

17. The method of claim 11, wherein the largest dimension of the radiating aperture of said antenna system is no greater than about three-quarters wavelength at the lowest frequency of its operational band.

18. A method for controlling a single aperture antenna having at least one driven element loaded for use in interference suppression and direction finding, said antenna system having at least two fundamental modes, a largest dimension no greater than about three-quarters wavelength at the lowest frequency of its operational band, and a plurality of control circuits embedded either in the radiation aperture of the antenna or behind a ground plane of said antenna, said control circuits having impedance characteristics that are either (a) predetermined and fixed or (b) variable by changing the values of electrical control signals applied to active components within the control circuits, wherein said control circuits are divided into at least two subsets, with impedance characteristics of each of said subsets being dependent on whether the subset is to be used for direction finding, interference suppression, or combined direction finding and interference suppression, said method comprising:

converting fundamental mode outputs of said at least one driven element into angle-of-arrival estimates for received signals;

dynamically selecting a subset of said control circuits for activation and regularly updating control settings of selected control circuits having variable impedance and belonging to said active subset, if any; and connecting said active subset electrically to said at least one driven element while disconnecting remaining said control circuits not belonging to said active subset from said at least one driven element;

wherein dynamic feedback control adapts biases applied to said control circuits having variable impedance and belonging to said active subset, if any, thereby adapting impedance characteristics of the at least one driven element to produce front-end control of the received signals; and wherein feedback at regular intervals is used to generate and output at regular intervals updated estimates of bias setting values.

19. The method of claim 18, further comprising:

converting measured signal outputs for said at least two fundamental modes of said antenna into angle-of-arrival measurements for the received signals;

creating new tracks for the received signals with said angle-of-arrival measurements that are statistically inconsistent with the angle-of-arrival estimates of previously existing tracks;

eliminating said existing tracks with no new statistically consistent said angle-of-arrival measurements;

combining said angle-of-arrival measurements and measured or estimated dynamics of said antenna system to update said existing tracks that provide estimated dynamics for a point-of-origin for each of the received signals; and computing the angle-of-arrival estimates for said existing tracks based on relative dynamics of said antenna system and the point-of-origin of each of the received signals.

20. The method of claim 18, wherein command input signals are provided at regular intervals by a receiver which computes the command input signals based on output signals from said antenna system.

* * * * *